3,156,659
POLYURETHANE COMPOSITIONS
Paul Robitschek, Eugene, Oreg., assignor to Hooker Chemical Corporation, Niagara Falls, N.Y., a corporation of New York
No Drawing. Filed Sept. 24, 1963, Ser. No. 311,225
17 Claims. (Cl. 260—2.5)

This invention relates to polyurethane compositions and to processes for their production. In another aspect, this invention relates to compositions for producing rigid fire-resistant foamed or cellular plastic products, to the products produced therefrom, and to processes for their production.

This application is a continuation-in-part of applications S.N. 623,795, filed November 23, 1956, now abandoned, and S.N. 764,774, filed October 2, 1958, now abandoned.

The compositions of the present invention are useful as polyurethane adhesives or binders. Still further, the compositions of the present invention are useful in the preparation of rigid, fire-resistant foamed or cellular plastic products. The compositions of the present invention are also useful in the preparation of laminates, coatings and potting compounds.

The polyurethane adhesives and polyurethane foams are well known in the art; however, the prior art compositions present many severe limitations.

Generally, polyurethane adhesives are used as a two-component system. Before use, the two components are generally mixed to give a liquid adhesive. Once the components are mixed, the resulting polyurethane adhesives will remain stable only for a very short period of time, generally not more than a matter of hours. This means that no more than enough adhesive for one day's use can be mixed at any one time. Accordingly, it is very desirable to provide a polyurethane adhesive which, once mixed, will remain stable for long periods of time. The bond strength of the prior art polyurethane adhesives generally falls off drastically at elevated temperatures. This greatly narrows the area of use of the prior art polyurethane adhesives. Accordingly, it is very desirable to provide a high temperature bond strength polyurethane adhesive.

The rigid plastic foams have found wide and varied use in industry. For instance, they can be used as core materials between skins of many and varied compositions. In aircraft construction, the foam can be enclosed between aluminum or fiber glass reinforced plastic skins to form an assembly which is rigid, strong and yet remarkably light. Because of their excellent electrical properties, polyurethane foams enclosed by fiber glass reinforced plastic skins have also found use in the construction of radomes. The polyurethane foams have another useful property, they develop a high degree of adhesion during the foaming process. As a result, they will adhere to skins composed to such varied materails as metals, plastics, ceramics, glass and the like. The resulting sandwich-type assemblies lend themselves well for use in such diverse fields as in the construction and insulation industries. This adhesive property makes the polyurethane foams of this invention highly useful in spray foam applications, wherein a foamable composition is sprayed onto the aforesaid materials to build up an insulating layer of adherent foam.

The rigid plastic foams can be utilized without skins as insulating materials to surround hot water or steam pipes, valves and the like. Their utility for such applications is enhanced by their ability to be applied, foamed, and used in situ.

The rigid plastic foams have many desirable properties. They have great structural strength coupled with low density. In sandwich-type constructions, they exhibit a high degree of rigidity, a property particularly desirable for building purposes. They are excellent vibration dampers and thus can support highly resonant loads. Because of their fine cell structure they are excellent heat and sound insulators. The foam cells can be made very fine and uniform, so that the cells are tough and non-brittle and hence highly resistant to rupturing.

The rigid polyurethane foams presently known to the art have several serious drawbacks. They are quite flammable and burn rapidly and freely when once ignited. Furthermore, during the foaming process large amounts of heat are liberated which may be so excessive that foamed sections greater than three inches thick may discolor or even char. Also because of the high degree of heat liberation mixing must be conducted at room temperature. It is very apparent that the flammability of plastic foams is a serious obstacle to their use for structural and building purposes, as well as for other purposes where safety and permanence are also of importance. The rigid polyurethane foams known to the art are also susceptible to degradation by the action of water, particularly at elevated temperatures. This drawback prevents their use in many applications.

The prior art teaches that polyurethane foams can be rendered less flammable by the incorporation of certain plasticizing substances which impart some degree of non-flammability to the polyurethane foams. Among such plasticizing substances are the various phosphate or phosphonate esters, or chlorinated compounds. However, such plasticizing substances are additives which are not chemically combined with the polyurethane plastic and are progressively lost from the plastic by evaporation, leaching, etc. Consequently, such foams do not have a permanently reduced flammability. Furthermore, the plasticizing additive affects the physical properties of the foam, particularly with regard to high temperature strength. The progressive addition of the plasticizer or additive improves the non-flammability, but generally lowers the high temperature strength.

It is an object of the present invention to provide a composition which can be used for the production of rigid cellular plastic materials having high strength. It is a further object to provide a composition which will produce plastic foams which have very low density. It is a further object to produce such compositions from which plastic foams can be formed which are fire-resistant. It is a further object to provide a composition which can be foamed at elevated temperatures, as well as at room temperature, and which can be foamed in thick sections without charring. It is still further an object to provide a strong, tough, rigid fire-resistant polyurethane foam wherein the fire-resisting property is permanent. It is a further object to provide a rigid fire-resistant foam having excellent strength even at high temperature, and a high resistance to the deleterious effects of water at elevated temperatures. It is an object of the invention to provide a foam having low moisture vapor permeability. It is also an object to provide processes for the production of such rigid fire-resistant foams.

It is also an object of the invention to provide polyurethane compositions useful as polyurethane adhesives. It is a further object of the invention to provide a polyurethane adhesive that simultaneously overcomes the aforementioned disadvantages, namely, possesses a high degree of shelf-life and possesses a good high temperature bond strength. It is another object of this invention to provide a polyurethane adhesive that possesses a high tensile and shear strength, whether the polyurethane adhesive is used immediately after mixing or a long period of time after mixing.

It is a still further object of the invention to provide polyurethane compositions which are useful as binders for varied compositions, such as sand, sandpaper, asbestos, abrasive grit for grinding wheels, and the like.

It is an object of the invention to provide polyurethane compositions useful in the preparation of laminates, coatings, and potting compounds.

Other objects and advantages of this invention will be apparent upon reading the following specification.

In accordance with the present invention, it has been found that polyurethane compositions can be produced by utilizing a mixture which comprises (A) an alkyd resin comprised of the reaction product of (1) an adduct of hexahalocyclopentadiene wherein the halogen is selected from the group consisting of chlorine, fluorine, bromine and mixtures thereof, and a dienophile having a plurality of functional groups capable of esterification, and (2) a polyhydric alcohol containing at least three hydroxyl group; and (B) an organic polyisocyanate. The halogen can be incorporated in the alkyd resin as an adduct of hexahalocyclopentadiene in the polycarboxylic portion or as an adduct of hexahalocyclopentadiene in the polyhydric portion of the polyester resin. For example, the halogen can be incorporated into (A) the alkyd resin as (1) the adduct of hexahalocyclopentadiene and a polycarboxylic compound containing aliphatic carbon-to-carbon unsaturation and (2) a polyhydric alcohol containing at least three hydroxyl groups. Alternatively, the halogen can be incorporated in the (A) alkyd resin as (1) the adduct of hexahalocyclopentadiene and a polyhydric alcohol containing aliphatic carbon-to-carbon unsaturation, (2) a polycarboxylic compound and (3) a polyhydric alcohol containing at least three hydroxyl groups. Still another method for incorporating the halogen into the alkyd resin is by utilizing (A) an alkyd resin comprised of the reaction product of (1) an adduct of hexahalocyclopentadiene and a polyhydric alcohol and (2) a polycarboxylic compound containing at least three carboxyl groups. The alkyd resin is produced by esterifying the adduct with the polyhydric alcohol. The alkyd resin is brought to the liquid state either by heating with or without a plasticizer until the desired viscosity is obtaned or by adding a liquid diluent. The polyisocyanate (and a foaming agent if a cellular product is desired) are then added and mixing is continued until a homogeneous mixture is obtained. The temperature is then raised if necessary to carry out the reaction process. The product is subsequently cured in an oven if desired.

Among the adducts of hexahalocyclopentadiene and polycarboxylic compounds which can be used in the preparation of the alkyd of this invention are: 1,4,5,6,7,7-hexachlorobicyclo - (2.2.1) - 5 - heptene-2,3-dicarboxylic acid; 1,4,5,6,7,7-hexachlorobicyclo - (2.2.1) - 5 - heptene-2,3 - dicarboxylic anhydride; 1,4,5,6,7,7 - hexachloro-2-methylbicyclo - (2.2.1) - 5 - heptene-2,3-dicarboxylic anhydride; the mono- or dimethyl ester of 1,4,5,6,7,7-hexachlorobicyclo-(2.2.1)-5-heptene - 2,3 - dicarboxylic acid; 1,4,5,6-tetrachloro-7, 7-difluorobicyclo-(2.2.1)-5-heptene-2,3-dicarboxylic acid; 1,4,5,6,7,7-hexachlorobicyclo-(2.2.1)-5-heptene-2-acetic-2-carboxylic anhydride; and 1,4,5,6,7,7 - hexachlorobicyclo-(2.2.1)-5 - heptene-2,3-dicarbonyl chloride which is the adduct of hexachlorocyclopentadiene with fumaryl chloride.

Among the adducts of hexahalocyclopentadiene and polyhydric alcohols which can be used in the preparation of the alkyd of this invention are: 2,3-dimethylol-1,4,5,6,7,7-hexachlorobicycle-(2.2.1)-5-heptene; and 3-(1,4,5,6,7,7 - hexachlorobicyclo - (2.2.1)-5-heptene-2-yl)-methoxy - 1,2 - propanediol; 2,3-dimethylol-1,4,5,6-tetrachloro-7,7-difluorobicyclo - (2.2.1) - 5 - heptene; 2,3-dimethylol-1,4,5,6,7,7-hexabromobicyclo - (2.2.1) - 5 - heptene; 3-(1,4,5,6-tetrachloro-7,7-difluorobicyclo-(2.2.1)-5-heptene-2-yl)-methoxy-1,2-propane diol. These compounds and the method of preparation are disclosed in U.S. Patent No. 3,007,958.

It is generally desirable that at least a portion of the total polyhydric alcohol component be a polyhydric alcohol containing at least three hydroxyl groups to provide a means for branching the alkyd resin. The entire alcohol component can be made up of a trifunctional alcohol, such as glycerol, or a difunctional polyhydric alcohol can be utilized as a part of the polyhydric alcohol component. Illustrative of polyhydric alcohols which can be used are the following: ethylene glycol; 1,4-butanediol; diethylene glycol; propylene glycol; glycerol; hexanetriol; butanetriol; trimethylol propane; trimethylolethane; pentaerythritol and the like.

Polycarboxylic compounds that are suitable for reaction with the alcohol adduct of hexahalocyclopentadiene are preferably aliphatic, such as adipic, succinic, oxalic, malonic and glutaric; but also include phthalic, isophthalic, terephthalic, 1,4-cyclohexadiene-1,2-dicarboxylic acid, and the like.

It should be noted that where the term "polycarboxylic compound" is employed, any polycarboxylic compound which is equivalent in function can be utilized, i.e., polycarboxylic acids, polycarboxylic acid anhydrides, polycarboxylic acid halides, polycarboxylic acid esters and mixtures thereof.

The combined halogen-containing alkyd resins produced according to the present invention are generally viscous at room temperature. Consequently, prior to foaming, it is desirable to transform them to the liquid state. This can be accomplished by applying heat to the alkyd resin until a temperature is reached at which the alkyd has a suitable fluidity. The temperature at which a suitable fluidity is reached can be lowered by the inclusion of plasticizing substances, among which are such substances as chlorinated esters of fatty acids, phosphate esters, phthalate esters, adipate esters and the like. Alternatively, the alkyd resin can be diluted with suitable solvents such as ketones, aromatic hydrocarbons or chlorinated hydrocarbons.

A large number of various organic polyisocyanates can be used. The aromatic polyisocyanates are more reactive and less toxic than the aliphatic members. Consequently, the aromatic ones are preferred in the present invention. The preferred compounds which are at present most readily available commercially are 2,4-tolylene diisocyanate; 2,6-tolylene diisocyanate and mixtures thereof. However, others can be used, among them 4,4'-methylene-bis(phenyl isocyanate); 3,3'-bitolylene-4,4'-diisocyanate; 3,3'-dimethoxy-4,4'-biphenylene diisocyanate; 1,5-naphthyl diisocyanate; 1,3,5-benzene triisocyanate; 4,4',4''-triphenylmethane triisocyanate; polymethylene polyphenylisocyanate and mixtures thereof. Higher isocyanates are provided by the liquid reaction products of (1) diisocyanates and (2) polyols or polyamines. Isothiocyanates can also be employed. Also contemplated are the many impure or crude polyisocyanates, such as crude mixture of methylene bis(4-phenylisocyanate).

Reaction catalysts can be employed in the urethane reaction. The catalyst can be any of the conventional catalysts, such as tertiary amines, for example, triethylamine, N-methyl morpholine, triethanolamine, and the like. Also suitable are antimony compounds such as antimony caprylate, antimony naphthenate, or antimonous chloride. In addition, tin compounds such as dibutyltin dilaurate, tri-n-octyltin oxide, or stannic chloride can be used.

When the polyurethane compositions of the present invention are foamed, any foaming agent can be employed provided that it is a material capable of liberating gaseous products when heated or when reacted with an isocyanate. If the foaming is carried out at elevated temperatures, the presence of water, which is a conventional foaming agent known to the art, is not entirely suitable or desirable because of difficulties of controlling the reaction. However, with special care, high strength, low density foams can be formed, even in the presence of water. One foaming system which is especially suitable for carrying out the foaming reaction at an elevated temperature is described in U.S. Patent No. 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol and the like. Examples of catalysts include: sulfuric acid; phosphoric acid; sulfonic acid; and aluminum chloride and the like. In addition, various secondary alcohols and glycols can be used such as: 1-phenyl-1,2-ethanediol; 2-butanol; and the like. Generally, secondary alcohols should be used with strong concentrated acid catalysts as above; however, certain secondary alcohols can be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methyl-phosphonium chloride. In addition, mixtures of the above foaming agents can be employed.

When foaming agents are used which are of the alcoholic type, it is generally desirable to add a catalyst in order that they will function at a suitable temperature. The catalyst should be either a strong inorganic or organic acid, or a Lewis-type acid. Among these are sulfuric acid, phosphoric acid, para toluene sulfonic acid, aluminum chloride, nitric acid, chlorosulfonic acid, and hydrochloric acid. Generally, up to 1.5 percent by weight of concentrated acid based on the total composition can be employed.

Alternatively, the polyurethane compositions of the present invention can be foamed without a reactive foaming agent. This is usually done by introducing gas into the catalyzed resin to form a foam stable enough to retain its shape until the resin gels. This method of foaming can be accomplished by utilizing as a foaming agent a low boiling liquid such as a fluorochlorocarbon having a boiling point up to 50 degrees centigrade, preferably 20 to 50 degrees. Examples are trichlorofluoromethane, trichlorotrichloroethane, dichlorofluoromethane, chlorofluoroethane, difluorochloroethane, and dichlorodifluoroethane.

The polyurethane compositions of the present invention can, if desired, be stored at low temperatures and foamed thereafter.

The proportion of the components of the compositions of the present invention can be varied over a wide range to obtain various properties. For instance, if a foam having a high degree of fire resistance is desired, a larger halogen content is employed. Foams containing 25 percent or more halogen by weight are very highly fire resistant. Foams which contain 4 percent or less combined halogen by weight have a lower degree of fire resistance. When varying percentages of halogen are used, the foam will have varying degrees of fire resistance, the degree being generally in proportion to the amount of halogen incorporated into the foam. In general, in order to obtain a foam which is fire resistant even in the absence of other additives, the alkyd resin which is used to make the foam should have a halogen content of at least about 10 percent by weight. The ratio of the polyhydric alcohol such as glycerol to the polybasic acid can be expressed as the hydroxyl-carboxyl ratio. The hydroxyl-carboxyl ratio can be varied over a wide range. However, the preferred range is 1.6:1 to 2.0:1 for the best compressive strength.

The polyisocyanate concentration can be varied over a wide range; however, the preferred polyisocyanate concentration is from about 30 to about 200 percent of isocyanato groups based on the number of hydroxyl and carboxyl groups in the alkyd resin (and foaming agent when one is used). A range of 85 to 115 percent is preferred.

The amount of foaming agent used is not critical and is dictated by the type of foam desired. If a very dense foam is desired, only a small amount need to be used. If a very light foam is desired, a maximum amount is used. The amount used also depends upon the type of foaming agent. When using a blowing agent comprised of a tertiary alcohol such as tertiary amyl alcohol, it has been found that 1.5 grams is sufficient to foam a total ingredient mixture of 35 grams to produce a fire-resistant foam having a density of 2.0 to 2.5 pounds per cubic foot. Additional blowing agent can be used if desired.

When the tertiary alcohol type of blowing agent such as tertiary butyl or tertiary amyl alcohol is used, it must be used in conjunction with a catalytic amount of concentrated acid such as sulfuric acid. The amount of the acid may be varied from about 0.1 gram to about 0.5 to give satisfactory results when used together with 1½ grams of the tertiary alcohol. From 0.3 percent to 1.5 percent by weight concentrated sulfuric acid based on the total foam composition gives excellent results.

When the polyurethane compositions of the present invention are utilized for an adhesive, the alkyd resin is brought to a state of suitable fluidity and rapidly mixed with a polyisocyanate. The mixture is made compatible at an elevated temperature, generally from 60 to 150 degrees centigrade, and then rapidly cooled to below 30 degrees centigrade.

The resulting polyurethane adhesives have been found to possess many new and unexpected properties. The polyurethane adhesives of the present invention remain stable in the solid state for many weeks at ambient temperatures if, of course, stored in substantially anhydrous conditions. Adhesive used after storage for long periods of time prior to gelation still retain their excellent properties after curing, i.e., they possess high temperature strength, shear strength and tensile strength. Although it is preferred to store these polyurethane adhesives in the solid state, the solvents generally used with other adhesives can also be used with the polyurethane adhesives of the present invention, i.e., adhesives are frequently used with low boiling solvents which are evaporated at higher temperatures leaving the base adhesive. Furthermore, the polyurethane adhesives of the invention can be used with a carrier or in a dry state. By carrier, it is meant various substances such as copper foil, lead foil, tissue paper, etc. The carrier is impregnated with the adhesive and used in this highly impregnated state. It has been found that the polyurethane adhesive of the present invention retains its excellent tensile and shear strength and high temperature bond strength when used with a low boiling solvent or with a carrier. When the adhesive is used in its dry state, it is powdered and spread on the cold work piece, the pieces clamped and heated; or spread on the hot work piece and the pieces clamped and heated. It has been found that the polyurethane adhesive of the present invention also retains its high tensile and shear strength and high temperature bond strength when used in this manner.

It is often desirable to use the halogenated alkyd resin of this invention in combination with another hydroxyl-containing polymeric composition in the preparation of polyurethane compositions. The additional hydroxyl-containing polymer preferably has a hydroxyl number between about 25 and 900. Such a polymer can be a polyester, a polyether or mixtures thereof. The polyesters are reaction products of a polyhydric alcohol and a polycarboxylic compound. The polycarboxylic compound can be aliphatic, cycloaliphatic, aromatic, or heterocyclic and include, for example, any of the carboxylic compounds set forth hereinbefore. Examples of polyhydric alcohols are also those disclosed hereinbefore. The polyethers are the reaction products of (1) a polyhydric alcohol, a polycarboxylic acid or a polyphenolic compound, and (2) a monomeric 1,2-epoxide, such as propylene oxide. The polyhydric alcohols and polycarboxylic acids are any of such compounds listed hereinbefore. Polyphenolic compounds which can be employed include the reaction products of phenolic compounds with aldehydes, such as phenol-formaldehyde resins.

Various additives can be incorporated which serve to provide different properties. For instance, antimony oxide can be used to improve fire resistance; fillers, such as clay, calcium sulfate or ammonium phosphate, can be added to lower cost, and improve density and fire resistance; ingredients such as dyes may be added for color, and fibrous glass, asbestos, or synthetic fibers can be added for strength.

The following examples serve to illustrate the present invention and the improvements resulting therefrom, but are not intended to limit it. All parts are by weight and temperatures in degrees centigrade unless otherwise specified.

EXAMPLE 1

A combined-chlorine alkyd resin was prepared in the following manner: a five-liter three-necked flask, equipped with an agitator, a thermometer and a nitrogen inlet tube leading into the reaction mixture was immersed in an oil bath. A ten-inch column packed with glass helices was installed in one neck of the flask and connected to a water-cooled condenser. 699.9 grams of glycerol were placed in the reactor and the agitator started. After preheating the glycerol to 100 degrees centigrade, nitrogen was passed through the reactor at a rate of 0.01 to 0.02 cubic foot per minute. Then, 1555.5 grams of chlorendic acid (1,4,5,6,7,7-hexachlorobicyclo-(2.2.1)-5-heptene-2,3-dicarboxylic acid) and 292.3 grams of adipic acid were charged into the reaction flask. Heating and stirring were continued, and the temperature of the reaction mixture was gradually raised to 158 to 160 degrees centigrade over a period of 1 to 1¼ hours. After maintaining the reaction for an additional 1¼ hours at 158 to 160 degrees centigrade, the nitrogen flow was increased to 0.03 cubic foot per minute. These conditions were maintained at 158 to 160 degrees centigrade for 5 hours, and then the nitrogen flow was increased to 0.05 cubic foot per minute for an additional 8½ hours. At the end of this time, the acid number of the resin was 16. In order to lower the acid number, a vacuum of 100 to 200 millimeters was applied at the reaction temperature of 158 to 160 degrees centigrade for 3½ hours. The resulting amber-colored resin solidified when poured into a large flat pan, and was allowed to cool to room temperature. The resin had an acid number of 5.6, a water content of 0.079 percent, and a density of 1.5 grams per cubic centimeter.

EXAMPLE 2

Twenty grams of the alkyd described in Example 1 were heated to 130 degrees centigrade and 0.23 gram of Aerosol OT (dioctyl sulfosuccinate, marketed by American Cyanamid Co.) was then dissolved therein. The mixture was cooled to 102 degrees centigrade and 14.7 grams of Nacconate 80 (a mixture of 80 percent 2,4-tolylenediisocyanate and 20 percent 2,6-tolylenediisocyanate, marketed by the National Aniline Division of Allied Chemical and Dye Corp.) which had been kept at room temperature were added to it. The reactants were mixed at 95 degrees centigrade for 4 minutes and then cooled to 70 degrees centigrade. The blowing agent which was 0.6 milliliter of 50 percent aqueous Tween 20 (polyoxyethylene sorbitan monolaurate solution, marketed by the Atlas Powder Co.) was added, and the mixture was rapidly stirred for 2 minutes. The mixture was allowed to react and foam at 115 degrees centigrade. The resultant cellular product had a fine cell structure and a density of 2.6 pounds per cubic foot.

EXAMPLE 3

Twenty grams of an alkyd such as product above in Example 1 and four grams of MPS–500 (a mixture of methyl pentachlorostearate and 5 percent epoxidized soybean oil, marketed by Hooker Chemical Corp.) were weighed into a 125 cc. beaker and heated on a hot plate, while stirring with a thermometer until the mixture was completely fluid and homogeneous. The temperature of this mixture was adjusted to about 107 degrees centigrade. Then, 12.6 grams Nacconate 80, which had been kept at room temperature, were added and the mixture stirred for 3½ minutes. The mixture became homogeneous in about 1½ minutes. The temperature generally dropped from 85 to 70 degrees centigrade. At the end of this time, 1.8 cc. of t-amyl alcohol solution, containing three drops of concentrated sulfuric acid was added, and the mixture stirred and cooled to 50 degrees centigrade in a water bath. The creamy viscous mixture was maintained at this temperature for 15 minutes with stirring. During this time, the mixture thickened into a pasty mass. It was then heated with stirring to 80 degrees centigrade over a one to two minute period. The resulting fluid, creamy, mass was poured into a 16-ounce paper cup and the cup placed into a circulating oven at 120 degrees centigrade for one hour. The foam rose to its maximum height in five to ten minutes, and was fully cured in 30 to 50 minutes. The foam consisted of small uniform cells, had a density of 2.9 to 3.1 pounds per cubic foot, and a compressive yield strength of 20 to 30 pounds per square inch.

A variation of the present invention may be practiced by preparing a prepolymer first, which is indefinitely stable at room temperature under anhydrous conditions and then adding additional alkyd and the foaming system when it is desired to foam the material at a subsequent time. The following example illustrates this process.

EXAMPLE 4

Twelve grams of an alkyd as prepared above in Example 1 were weighed into a 125 cc. Erlenmeyer flask, together with 25.2 grams of Nacconate 80. The mixture was then heated and stirred with a thermometer at between 100 and 110 degrees centigrade until all the alkyd had dissolved into the Nacconate 80. The mixture was then cooled to room temperature and the flask tightly stoppered. The resulting product was a composition obtained by the reaction of the alkyd and the diisocyanate and is termed a "prepolymer." The prepolymer was allowed to stand at room temperature for several days before using. After this period, the foam was prepared in the following manner: Fourteen grams of the alkyd prepared in Example 1 and four grams of MPS–500 were added to a 125 cc. beaker. The mixture was then heated and stirred at 120 degrees centigrade until homogeneous. To this hot mixture was added 18.6 grams of the prepolymer produced above. The mixture was stirred at 80 degrees centigrade for three minutes during which time it became homogeneous and thick. At the end of this period, a solution of three drops of concentrated sulfuric acid in 1.8 cc. of t-amyl alcohol were added to the mixture and stirred in thoroughly for several seconds. The mixture was then poured into a 16-ounce paper cup and heated for one hour at 120 degrees centigrade for expansion and curing. The cured foam had a density of 3.3 pounds per cubic foot and contained a fine uniform cell structure. The compressive yield strength and specific strength of the foam were 33.5 pounds per square inch and 10.2 pounds per square inch per pound per cubic foot, respectively. The specific strength is obtained by dividing the compressive yield strength in pounds per square inch by the density of the foam in pounds per cubic foot.

The nature of the properties of the fire-retardant foams may be considerably varied by the choice of the alkyd resin. If an alkyd is chosen which is primarily linear and has a relatively high molecular weight, a less rigid and more elastic foam results on reaction with the diisocyanate. On the other hand, when a highly branched alkyd is used the foamed product will be highly cross-linked and rigid even at high temperatures. In order to obtain foams exhibiting properties somewhere between these two extremes, mixtures of linear and branched alcohols may be used with the dibasic acids to introduce the desired amount of cross-linking. The resiliency of the present foams may be increased considerably by substituting ethylene glycol from the glycerol in an amount up to about 100 percent of the total polyhydric alcohol.

EXAMPLE 5

An alkyd resin was prepared in manner similar to that described in Example 1 with the exception that no adipic acid was used, but the sole polycarboxylic acid component of the alkyd consisted of chlorendic acid. The equipment was the same as that described in Example 1. Six hundred ninety-nine and nine-tenths grams of glycerol was placed in the reactor and the agitator started. After a temperature of 100 degrees centigrade had been attained, nitrogen was passed through the reactor at a rate of 0.01 to 0.02 cubic foot per minute. Then, 2335 grams of chlorendic acid were charged into the flask. The heating and stirring was continued, and the temperature of the reaction of the mixture was gradually raised to 158 to 160 degrees centigrade over a period of 1 to 1¼ hours. After an additional 1¼ hours, at 158 to 160 degrees centigrade, the nitrogen flow rate was increased to 0.03 cubic foot per minute. This rate was maintained for an additional 10½ hours. The total reaction time to this point was 18 hours. Nitrogen was vigorously blown through the reaction mixture for an additional 15 hours while heating was continued. A vacuum of 100 to 200 millimeters was applied at the reaction temperature of 158 to 160 degrees centigrade for 7 hours. The resulting resin solidified upon cooling to room temperature. This alkyd resin thus prepared which had an acid number of 14.0 and a water content of 0.06 was then used to prepare a flame-resistant foam in the same manner as described in Eample 3. The resulting foam had a density of three pounds per cubic foot, a compressive strength of 16.3 pounds per square inch and a specific strength of 5.4 pounds per square inch per pound per cubic foot. The material had good cell structure and was tough.

EXAMPLE 6

In this example, an alkyd was prepared using the same procedure as described in Example 1, except that hexanetriol was used in place of glycerol. The proportions used were 4 moles of chlorendic acid, 2 moles of adipic acid and 7.6 moles of hexanetriol. The alkyd thus prepared was then foamed with Nacconate 80 and tertiary amyl alcohol containing 3 drops of sulfuric acid as described in Example 3. A strong rigid foam having low density was obatined.

When it is desired to produce a foam which has somewhat higher resiliency, a part of the glycerol can be substituted by a glycol. This results in a reduction in the amount of cross-linking and renders the final foamed material more resilient.

The following example illustrates the production of such a glycol-containing foam.

EXAMPLE 7

An alkyd was prepared using the method of Example 1 with the following materials: 5 moles chlorendic acid, 1 mole adipic acid, 4.12 moles glycerol, and 4.0 moles ethylene glycol. The alkyd is then used to prepare a foam in a manner similar to Example 3, utilizing 40 grams of the alkyd and 39.6 grams of Nacconate 80. The alkyd was first mixed with 4 grams of MPS–500, and then with the Nacconate 80, and the mixture made compatible at 70 to 80 degrees centigrade. Three and six-tenths cubic centimeters of tertiary amyl alcohol containing 6 drops of concentrated sulfuric acid were added as soon as a holding temperature of 50 degrees centigrade was reached. The foam was expanded and cured at 120 degrees centigrade for one hour. At the end of that time a good foam was obtained having a density of 3.3 pounds per cubic foot, and which was somewhat more resilient than the foams produced which contained only glycerol.

EXAMPLE 8

A fluorine-containing alkyd resin was prepared as follows: the apparatus used was similar to that of Example 1, except that a 500 cc. three-necked flask was used. Eighty-seven and five-tenths grams of glycerol were placed in the reactor and the agitator started. After preheating to 100 degrees centigrade, nitrogen was passed through the reactor at a rate of .003 cubic foot per minute. Thirty-six and five-tenths grams of adipic acid and 169 grams of 1,4,5,6-tetrachloro-7,7-difluorobicyclo-(2.2.1)-5-heptene-2,3-dicarboxlic anhydride were charged into the reactor. The reaction was continued for 1¼ hours, during which time the temperature had increased to 160 degrees centigrade. The mixture was then heated for an additional 1¾ hours. The pressure was then reduced to 54 millimeters in the presence of a nitrogen atmosphere and maintained for 3¾ hours. After cooling, the resin thus formed was an amber-colored brittle solid. The acid number was 20.0, and viscosity at 120 degrees centigrade was 42.8 seconds by the Gardner method.

EXAMPLE 9

A combined fluorine-containing polyurethane foam was made as follows: 20 grams of the alkyd resin made above in Example 8 and 4 grams of MPS–500 were added to a beaker and the mixture stirred with a thermometer at 120 degrees centigrade until it became homogeneous. It was then cooled to 100 degrees centigrade, while stirring and 13.3 grams of Nacconate 80 were added and the mixture stirred rapidly for 20 to 30 seconds. As soon as the toluene diisocyanate became compatible with the alkyl-MPS–500 mixture, the temperature of the solution was reduced to 50 degrees centigrade by rapid stirring and cooling in an ice bath over a period of 2½ minutes. A mixture of 2.3 cc. t-amyl alcohol and 0.52 gram concentrated sulfuric acid was then added to the reaction mixture and the temperature maintained at 50 degrees centigrade over a two-minute period, and then poured into a cardboard container and placed in a circulating oven at 120 degrees centigrade for one hour. When cooled the foam had a density of 3.5 pounds per cubic foot, a compressive yield strength of 21.2 pounds per square inch, and was rapidly self-extinguishing when ignited.

The following examples show the preparation of a combined chlorine-containing polyurethane foam in the form of the Diels-Alder adduct of hexachlorocyclopentadiene and itaconic anhydride.

EXAMPLE 10

An alkyd resin was prepared as follows: the apparatus used was the same as in Example 1, except that a 300 cc. three-necked flask was used as the reaction chamber. Thirty-two grams of glycerol was placed in the reactor and the agitator started. After the glycerol had been preheated to 100 degrees, nitrogen was passed through the reactor at the rate of 0.003 cubic foot per minute, and 70 grams of the Diels-Alder adduct of hexachlorocyclopentadiene with itaconic anhydride and 13.4 grams of adipic acid were charged into the flask. Preparation of the adduct is disclosed in U.S. Patent No. 2,779,701. Heating and stirring were continued and the temperature raised to 160 degrees centigrade over a two-hour period, while 0.003 cubic foot per minute of nitrogen was passed into the reaction flask. Then, a vacuum of 100 to 200 millimeters was applied for 35 minutes. The mixture was heated for an additional 1½ hours at atmospheric pressure with the continued passage of nitrogen. A vacuum was then re-applied for an additional ¾ hour. The resin was then poured and allowed to cool. It was dark brown, had an acid number of 13.3 and a viscosity at 120 degrees of 286.7 seconds as measured by the Gardner method.

EXAMPLE 11

Twenty grams of the alkyd resin produced above in Example 10 and 4.0 grams of MPS–500 were added to a 125 cc. beaker and the mixture stirred with a thermometer at 120 degrees centigrade until it became homogeneous. The mixture was allowed to cool to 107 degrees centigrade with stirring and at that point, 11.5 grams of toluene diisocyanate (Nacconate 80) was added and the mixture stirred rapidly for 20 to 30 seconds until it became completely homogeneous. The mixture was cooled in ice water with rapid stirring over a period of three minutes until the temperature had reached 50 degrees centigrade. At that point, a mixture of 0.69 gram of concentrated sulfuric acid and 2.3 cc. of tertiary amyl alcohol was added and the mixture stirred at 50 degrees centigrade for 6½ minutes. The mixture was then heated in an oil bath to 80 degrees centigrade over a two-minute period and poured into a cylindrical cardboard container. The container was then placed in a circulating oven at 120 degrees centigrade for one hour. The rigid expanded foam had a density of 2.8 pounds per cubic foot, a compressive yield strength of 15.1 pounds per square inch and was rapidly self-extinguishing when ignited.

EXAMPLE 12

In this example, a low halogen content alkyd resin was prepared. The method used was that described in Example 1. The materials used were 389 grams of chlorendic acid, 731 grams of adipic acid and 699.9 grams of glycerol. The final resin had an acid number of 19.2, a Gardner viscosity at 25 degrees centigrade of 6200 seconds, a water content of 0.22 percent, and was light-brown in color.

The following example illustrates the preparation of a combined halogen-containing foam of the present invention using a foaming method which can be carried out at room temperature.

EXAMPLE 13

Into a 250 cc. beaker containing 40.0 grams of an alkyd prepared as in Example 12 was added 8.0 grams of tris-betachloroethylphosphate and the mixture thoroughly mixed by stirring with a thermometer. At this point, 46.4 grams of Nacconate 80 were added and the mixture stirred for 40 minutes, while the temperature was maintained below 45 degrees centigrade by occasional cooling in a water bath. During this time, the mixture gradually became clear and compatible after about 25 minutes and became thick and creamy toward the end of the period. Then, 3.3 cubic centimeters of an aqueous solution, which had been prepared by dissolving 40 grams of diethanolamine, 40 grams of polyoxyethylated vegetable oil (Emulphor EL–719, marketed by Antara Chemical Company) in 93 cc. of water, was then added and rapidly stirred into the original mixture for 35 seconds. The resulting expanding mixture was poured into a paper container where it was allowed to expand and harden for two days at room temperature. After post-curing at 120 degrees centigrade for 1 hour, the foam had a density of 2.5 pounds per cubic foot and a compressive yield strength of 31.4 pounds per square inch.

Another class of compounds which has been found very useful for use as a foaming is that made up of compounds containing methylol groups. Among them are the dimethylol ureas and methylol-substituted phenolic compounds. Among the latter are the dimethylol and trimethylol derivatives of phenol, various substituted phenols, and polyphenols. These compounds are especially useful in that they can be dissolved in the resinous material to be foamed. They can then be made to polymerize by the addition of heat or a catalyst or both to liberate water. The water reacts with the isocyanate to produce carbon dioxide which, in turn, causes foam expansion. They have an additional advantage in that they catalyze the curing action and enable the finished foam to be cured in a much shorter time. Where the dimethylols are not readily soluble in the alkyd resin, as is the case of dimethylol urea, they may be dissolved in a mutual solvent or melted and dispersed into the mixture by rapid stirring. The following examples illustrate the use of various methylol compounds as foaming agents.

EXAMPLE 14

After weighing 20.0 grams of chlorendic acid alkyd such as was prepared in Example 1, and 4.0 grams of MPS–500 into a 125 cc. beaker, the mixture was heated to 120 degrees centigrade and mixed thoroughly. Two grams of dimethylol urea (Du Pont Arboneeled A) was then added and stirring continued at 120 degrees centigrade until all solid had melted.

When the temperature of the cloudy mixture reached 110 degrees centrigrade, 12.1 grams of the Nacconate 80 were added and the mixture stirred rapidly at 75 to 85 degrees centigrade for 1¾ minutes to give a creamy viscous mass. The material was then poured into a paper container and allowed to stand at room temperature for one minute, during which time expansion was almost complete. Expansion was completed and the foam cured by heating at 120 degrees centigrade for 30 to 60 minutes. The cured foam had a fine uniform cell structure and a density of 5.0 pounds per cubic foot.

EXAMPLE 15

3,5-diisopropyl-2,6-dimethylol phenol was prepared by mixing one mole of 3,5-diisopropyl phenol with 10.0 moles of formaldehyde as a 40 percent methanolic solution in the presence of 1.0 moles of KOH in a form of 57.5 percent aqueous solution. After 47 hours at room temperature, two moles of the formaldehyde had reacted. A crystalline precipitate was filtered off, washed with n-hexane, and crystallized from cyclohexane to a melting point of 93 to 94 degrees centigrade.

Four grams of the compound thus prepared were added to a 125 cc. beaker containing a hot homogeneous mixture of 20 grams of an alkyd resin such as produced in Example 1, and 4 grams of MPS–500, and the mixture stirred at 115 degrees centigrade until all the solid had dissolved. The mixture was then allowed to cool to 90 degrees centigrade, at which point 11.3 grams of Nacconate 80 were added. After 60 seconds of mixing, the resulting creamy liquid was poured into a paper container and allowed to stand at room temperature for one minute, during which time expansion of the material occurred. Additional expansion and curing of the foam was obtained by heating at 120 degrees centigrade for 15 to 25 minutes. The rigid product had a density of 4.6 pounds per cubic foot.

EXAMPLE 16

4-t-butyl-2,6-dimethylol phenol was prepared by mixing 1.0 mole of para-tertiarybutyl phenol with 10.0 moles of formaldehyde as a 40 percent methanolic solution in the presence of 1.0 mole of potassium hydroxide in the form of a 57.5 percent aqueous solution and allowing to stand at room temperature for several days. The crystals were then filtered off and then purified in a manner similar to Example 15 above.

Ten and four-tenths grams of the 4-t-butyl-2,6-dimethylol phenol thus prepared was added to a 250 cc. beaker containing a fluid mixture of 40 grams of an alkyd resin such as prepared in Example 1, and 8 grams of MPS–500 at 120 degrees centigrade, and the mixture stirred until all the solid had dissolved. When the clear mixture was cooled to 90 degrees centigrade, 22.6 grams of toluene diisocyanate was added. After 2½ minutes of additional mixing at 75 degrees centigrade, the creamy mixture was poured into a paper container and allowed to stand at room temperature for one minute, at which time most of the expansion had occurred. Additional expansion and curing of the foam was obtained by heating at 120 degrees centigrade for 20 minutes. The rigid product had a density of 2.9 pounds per cubic foot.

EXAMPLE 17

4-t-octyl-2,6-dimethylol phenol was prepared in a manner similar to that used for preparing the dimethylol compound in the example above. Eight and nine-tenths grams of the 4-t-octyl-2,6-dimethylol phenol thus prepared were then placed in a 250 cc. beaker containing a fluid mixture of 40 grams of an alkyd resin such as prepared in Example 1 above and 8 grams of MPS–500 maintained at 120 degrees centigrade, and the mixture stirred until all the solid had dissolved. After the clear mixture had been cooled to 85 degrees centigrade, 22.6 grams of Nacconate 80 were added. Stirring was continued at 75 degrees centigrade for 2¾ minutes. After the mixture had become homogeneous, it was poured into a paper container and allowed to stand for 3 minutes at room temperature, during which time most of the expansion had taken place. Additional expansion and curing of the foam was obtained by heating at 120 degrees centigrade for 20 minutes. The rigid foam had a density of 3.2 pounds per cubic foot.

In addition to the dimethylol derivatives of compounds named above, polymeric condensation products of the compounds may also be used. Among these compounds are the low molecular weight phenol formaldehyde resins condensed to contain 2 to 4 nuclei such as bis(3,5-diisopropyl-1-hydroxy-6-methylolphenol) methane as follows.

EXAMPLE 18

To a 125 cc. beaker containing 20.0 grams of the combined chlorine alkyd prepared as in Example 1 was added 4.0 grams of MPS–500 and the mixture stirred at 115 degrees centigrade until completely homogeneous. To this mixture was then added 8.0 grams of bis-(3,5-diisopropyl-1-hydroxy-6-methylolphenol) methane and the mixture stirred rapidly for several minutes, while the temperature was allowed to cool to 105 degrees centigrade. At this point, 11.3 grams of Nacconate 80 were added and rapidly mixed in at 80 to 90 degrees centigrade for 1¾ minutes. The creamy mixture was then poured into a 16-ounce paper drinking cup, allowed to stand at room temperature for 1½ minutes, then placed into a circulating oven at 120 degrees centigrade for 20 minutes. The cured foam had a dark color, a fine uniform cell structure, a density of 6.6 pounds per cubic foot, and a compressive yield strength of 128 pounds per square inch.

As indicated above, activated primary alcohols such as the polymethylol phenols are very useful as blowing agents in foam preparation. A similar activated primary alcohol which can be used as a blowing agent in polyurethane foam preparation is tetrahydroxymethylphosphonium chloride. Again, a mineral acid catalyst is not necessary in foam preparation, while the phosphorus in the compound markedly increases the fire resistance of the resulting foam.

EXAMPLE 19

Into a 125 milliliter beaker was weighed 20.0 grams of a chlorendic acid alkyd prepared as in Example 1, 4.0 grams of MPS—500 and 3.2 grams of tetrahydroxymethylphosphonium chloride. The mixture was then heated to 120 degrees centigrade and stirred until homogeneous. Stirring was continued until the temperature had cooled to 107 degrees centigrade. At this point, 12.1 grams of Nacconate 80 were then added and the mixture was compatible over a three to four-minute period at 70 degrees centigrade. Stirring of the viscous liquid was continued at 70 degrees centigrade so that the total mixing time was eight minutes, the mixture quickly heated to 80 degrees centigrade, and poured into a paper container. Expansion and curing was carried out by heating at 120 degrees centigrade for one hour. The fully expanded foam had a density of 2.5 pounds per cubic foot.

Although the incorporation of a plasticizer into a foam formulation simplifies the preparation to some extent by allowing the mixing temperature to be reduced, such a plasticizer is not absolutely necessary. The following is an example of foam preparation using alkyd, diisocyanate, and blowing agent as the only ingredients.

EXAMPLE 20

An alkyd was prepared in a manner similar to that described in Example 1 with the exception that the ingredients consisted of 438.4 grams of adipic acid, 1167.0 grams of chlorendic acid, and 699.9 grams of glycerol. The equipment was the same as that described in Example 1. The resulting alkyd had an acid number of 5.1, a water content of 0.23 percent, and a Gardner viscosity at 120 degrees centigrade at 47.5 seconds.

Twenty grams of the alkyd described above were weighed into a 125 cc. beaker and heated in an oil bath to about 110 degrees centigrade where the alkyd was quite fluid. At this point, 1.8 cc. of tertiary amyl alcohol was added and easily mixed in with a thermometer. As soon as the mixture was completely homogeneous, 13.2 grams of Hylene T (2,4-tolylene diisocyanate, marketed by Du Pont de Nemours, Wilmington, Delaware) was added and rapidly mixed in at 75 to 90 degrees centigrade over a three-minute period. To the resulting thick, homogeneous, creamy mixture was added three drops of concentrated sulfuric acid. After an additional one minute of rapid mixing the mixture was poured into a paper drinking cup and placed into an oven at 120 degrees centigrade for 22 hours. The cured foam had a small uniform cell structure and had a density of 3.9 pounds per cubic foot.

The excellent strength of the foams of the present invention are illustrated by the data in Table I below in which the compressive yield strength of the foam was tested at several temperatures. The alkyd used was that prepared as in Example 1, and the foaming method was that of Example 3, except that the 20 grams of the alkyd were used with 2.0 cc. of t-amyl alcohol, together with six drops of concentrated sulfuric acid as a blowing agent.

*Table I*

| Example No. | Temperature of Test, ° C. | Compressive Yield Strength | Density, lbs./cu. ft. |
|---|---|---|---|
| 21 | 23 | 24.8 | 2.42 |
| 22 | 80 | 20.9 | 2.16 |
| 23 | 100 | 20.1 | 2.42 |
| 24 | 120 | 17.4 | 2.42 |
| 25 | 144 | 8.4 | 2.50 |

The data in this table was obtained by compressing a foam sample two inches square and 2.5 to 3.0 inches high to yield point at two to six percent deflection using a Model L Dillon tester. The sample was cut with its longest dimension in the direction of the foam rise. Compression was also carried out in the direction of the major axis. The yield point was taken at the load at which there was a sharp break in the load deflection curve. The compressive yield strength at elevated temperatures was obtained in an identical manner using a heated insulated box with a circulating fan to obtain the desired temperature. The data in Table I illustrate not only that excellent strength is obtained at room temperature, but that when the temperature is raised to 120 degrees centigrade, at least 70 percent of the room temperature is retained. Even at temperatures as high as 140 degrees centigrade, appreciable strength is retained.

Table II below illustrates the resiliency or toughness of the foams of the present invention. In each case, a cubic sample having 2.54 centimeters on a side was placed in a press in such a manner that the direction of the grain, or the direction of the foam rise, was vertical. The sample was compressed to 1.27 centimeters and the pressure subsequently released. The height of the sample was measured immediately after the sample was taken out of the press, and then again after 24 hours. The percent recovery was calculated using the following relationship:

$$R = H - 1.27$$

$$\text{Percent recovery} = \frac{R \times 100}{1.27}$$

Where $R$=recovery in centimeters and $H$=height of sample in centimeters after compression.

The alkyd used in the foams tested was that of Example 1. Various density foams were made from this alkyd as indicated in the table.

In the following table, the specific strength of the foam is determined by dividing the compressible yield strength in pounds per square inch by the density in pounds per cubic foot.

*Table II*
RECOVERY OF RIGID FOAMS AFTER 50% DEFLECTION

| Example No. | Foam | Density, lbs./ft.³ | Specific Strength, p.s.i./p.c.f. | Recovery Immediately After Test | | Recovery 24 Hours After Test | |
|---|---|---|---|---|---|---|---|
| | | | | Height (H), cms. | Percent Recovery | Height (H), cms. | Percent Recovery |
| 26 | Chlorendic acid | 3.6 | 10.5 | 1.71 | 35 | 1.84 | 45 |
| 27 | do | 4.3 | 10.6 | 1.60 | 26 | 1.73 | 36 |
| 28 | do | 3.3 | 10.2 | 1.52 | 20 | 1.65 | 30 |
| 29 | do | 3.1 | 6.6 | 1.53 | 20 | 1.67 | 32 |
| 30 | do | 4.0 | 9.4 | 1.60 | 26 | 1.75 | 38 |
| 31 | do | 4.8 | | 1.70 | 34 | 1.87 | 47 |
| 32 | do | 3.3 | 10.4 | 1.67 | 32 | 1.83 | 44 |
| 33 | do | 2.9 | 10.0 | 1.60 | 26 | 1.75 | 38 |
| 34 | do | 2.6 | 9.1 | 1.65 | 30 | 1.84 | 45 |
| 35 | Styrofoam 33 | 2.0 | 16.0 | 1.54 | 21 | 1.61 | 27 |
| 36 | Corfoam 114 | 2.85 | 6.30 | 1.27 | 0 | (¹) | (¹) |

¹ Sample crumbled.

The data indicate that the resiliency of the low density foams is such that they are not cracked or broken under the severe conditions of the test, and recover much of their original shape after compression. This is in contrast with the data obtained from tests of Styrofoam 33, a polystyrenated foam produced by Dow Chemical Company, and Corfoam 114, a phenolic foam produced by Rezolin, Inc.

The excellent water resistance properties of the present foams are demonstrated in Table III below. Here, foams prepared by the composition and method of Examples 1 and 3 were immersed in water and maintained at the desired temperatures for the indicated time. At the end of the test period, the surface water was carefully removed with a paper towel and the sample weighed. The sample was then dried to a constant weight by heating at 70 degrees centigrade for 24 hours, and then tested for compressive yield strength as in Examples 21 to 25. It can be seen from the data that this treatment at temperatures of up to 50 degrees centigrade for 20 days resulted in no appreciable change in the specific strength of the foam, and in addition the total water absorbed was exceptionally low.

Table IV below contains data indicating the behavior of the present foams upon treatment in 100 percent relative humidity at a temperature of 70 degrees centigrade. The data was obtained by placing the samples in a closed desiccator containing water in a reservoir, but not in contact with the samples, and placing the desiccator in a circulating oven at 70 degrees centigrade. At the end of the test period, the sample was heated for several hours at 70 degrees centigrade to a constant weight and then tested, as in Examples 21–25. The results indicate that the strength of the foam remained essentially unchanged throughout this treatment. This is in contrast to the teaching of the prior art that conventional polyurethane foams distintegrate under such extreme conditions.

*Table IV*

| Example No. | Time of Treatment, Days | Initial Specific Strength, p.s.i./p.c.f. | Specific Strength After Drying at 70° C., p.s.i./p.c.f. |
|---|---|---|---|
| 41 | 31 | 8.5 | 10.2 |
| 42 | 28 | 10.5 | 10.9 |

As is known in the art, one of the major problems associated with the preparation of low density rigid foams is scorching. This phenomenon is caused by the accumulation of heat in the expanding foam because of its low thermal conductivity, and results in charring or discoloration of the foam interior when the thickness of the expanding foam is too great for rapid dissipation of the heat of the reaction. This phenomenon is quite undesirable in that it weakens the foam physically, and can result in complete destruction of the structure of the foam. To demonstrate this phenomenon, 587 grams of a commercial alkyd (Selectron-5922) was foamed using 548 grams of tolylene diisocyanate (Du Pont Hylene T) and 62.7 cc. of a 10 percent solution of Aerosol-OT in acetone.

The foaming mass wax expanded at 65 to 70 degrees centigrade in a wooden mold having a base 12 inches square and a height of six inches. The interior of the resulting foam sample was found to be considerably darker in color than the exterior indicating that charring had occurred during the expansion. In contrast to this, a foam of the present invention made according to Example 3 was expanded to form a foam sample in the form of a cube, each side of which was one foot. There was no sign of internal charring during the expansion and cure period and also no charring in the center of the final product. This demonstrates one of the major advantages of the rigid foam of the present invention over the con-

*Table III*

| Example No. | Temp. of Immersion, ° C. | Initial Specific Strength, p.s.i./p.c.f. | Specific Strength After Drying at 70° C. | Volume of H₂O Absorbed, cc. | H₂O Absorbed, Vol. percent | Initial Volume of Sample, cc. | Time Immersed, Days |
|---|---|---|---|---|---|---|---|
| 37 | 50 | 9.6 | 8.8 | 2.8 | 2.2 | 125 | 6 |
| 38 | 50 | 9.7 | 9.5 | 5.0 | 3.8 | 130 | 13 |
| 39 | 50 | 9.6 | 10.6 | 6.4 | 5.2 | 123 | 20 |
| 40 | 23 | 10.1 | 10.4 | 6.7 | 5.2 | 130 | 7 | ventional polyurethane foams, that is, the foams of the present invention can be foamed to great thicknesses without internal charring.

The chart below contains a comparison of the fire-resistant properties of the foams of the present invention compared to a foam produced from a non-chlorine-containing proprietary alkyd resin. The proprietary alkyd used was Selectron 5922, an alkyd marketed by Pittsburgh Plate Glass Company which is believed to comprise the condensation product of five moles of adipic acid, one mole of phthalic anhydride, and 7.5 moles glycerol, adjusted to 1.3 to 1.8 percent water. The alkyd was mixed at a temperature of 25 to 31 degrees centigrade for 30 minutes, and 2.7 to 2.9 cc. of a ten percent acetone solution of Aerosol OT as a foam stabilizer was used. Foam expansion was accomplished by heating at 60 degrees centigrade for one hour and post curing at 115 degrees centigrade for an additional hour. The chlorendic acid alkyd used was that produced in Example 1.

reaction product was then fractionated under vacuum and the fraction boiling at 203 to 205 degrees centigrade at 0.5 mm. was collected. Three hundred and fifty-four grams of the above product was obtained.

EXAMPLE 46

Two hundred and twenty grams (one-half mole) of the adduct prepared in Example 45, 92 grams (one mole) of glycerol and 148 grams of phthalic anhydride were placed in a one-liter, three-necked flask, 100 milliliters of toluene were added and the mixture heated to a temperature of about 200 to 210 degrees centigrade for a period of about 8 hours. During this time, water was continuously removed azeotropically in a Dean-Stark trap. After 8 hours, the residual toluene was removed by vacuum distillation. The final resin was a hard, brittle solid and had an acid number of 24. The resin thus obtained was plasticized by the addition of 20 percent tricresyl phosphate by weight.

Table V

| Example No. | Alkyd | Amount | Grams Nacconate 80/20 Grams of Alkyd | Remarks |
| --- | --- | --- | --- | --- |
| 43 | Proprietary Alkyd | 35 | 18.7 | Burns freely. |
| 44 | Alkyd of Example 1 | 25 | 17.1 | Self-extinguishing on ignition. |

The following test was additionally used to measure the high degree of fire resistance of the present foams. A standard Bunsen burner was adjusted so that the blue cone of the flame interior was about 1¼ inches long and the burner securely clamped to a ring-stand. The tip of the blue cone was then applied at right angles to the large surface of a foam sample having dimensions of 6" x 6" x 2" which was rigidly clamped to another ring stand. The flame was allowed to play upon the foam sample for 8½ minutes. When the sample had not disintegrated or burned through during this period, the burner was moved to within ½ of an inch of the original foamed surface and allowed to remain at that place for an additional 5½ minutes. When this test was applied to a sample of the foam of the present invention such as is prepared by Examples 1 and 3 having a density of 2.6 pounds per cubic foot there was immediate charring on the surface of the foam and smoking on the surface due to volatilization of the core material, but the gases given off at this point were non-flammable. The only flame visible was from the burner and the surface of the charred core material. At the end of the test, the surface of the sample was charred in a circular area roughly five inches in diameter corresponding mainly to the size of the flame applied, with the deepest penetration of the flame occurring to an extent of about 1½ inches. The general shape of the sample was unchanged except in the charred area. Throughout the test, there was only a slight warming sensation apparent when a hand was held on the backside of the foam opposite the flame. Removal of the flame resulted in no further burning of the foam. The addition of antimony oxide to the above foam formulation results in a foam having even greater fire resistance. Conventional polyurethane foams burn spontaneously when ignited in this manner and are completely consumed in a short time even though the flame is removed a few seconds after ignition.

EXAMPLE 45

3-(1,4,5,6,7,7-hexachlorobicyclo-(2.2.1)-5-heptene-2-yl)-methoxy-1,2-propanediol was prepared by mixing 196 grams of allyl glycerol ether and 350 grams of hexachlorocyclopentadiene and heating the mixture at from 140 to 150 degrees centigrade for about 48 hours. The crude Twenty grams of this plasticized resin were reacted with 14.5 grams of tolylene diisocyanate and a foaming agent consisting of two milliliters of a mixture of 10 parts tertiary amyl alcohol with one part concentrated sulfuric acid in a manner after the following: the resin was heated to 100 degrees centigrade and tolylene diisocyanate at room temperature was added slowly and the mixture held for 10 minutes at 60 degrees centigrade after the two materials were compatible. The tertiary amyl alcohol-sulfuric acid foaming agent was then added and the mixture held for an additional two minutes and then poured into a paper cup. The mixture was expanded and cured at 120 degrees centigrade for two hours, giving a foam with a density of about three pounds per cubic foot.

EXAMPLE 47

One hundred grams of solid alkyd prepared in Example 1 were placed in a beaker and heated to 130 degrees centigrade, until the solid melted to a fluid liquid. With stirring 43.8 grams of tolylene diisocyanate were added in two parts and stirring continued at 100 degrees centigrade for one minute, after which the mixture became compatible. The fluid liquid was poured into a flat tray of aluminum foil and rapidly cooled to room temperature in ice water. The resulting solid was stored in an air-tight jar at room temperature for 36 days, and the following test was run.

This solid was melted onto a piece of aluminum, and another piece of aluminum was pressed onto the adhesive with a C-clamp and the assembly cured at a temperature of 120 degrees centigrade for two hours. The bond thereby produced exhibited a shear strength of 2800 p.s.i. This same sample exhibited shear strengths of 2460 p.s.i. when tested at 83 degrees centigrade, and 1490 p.s.i. at 150 degrees centigrade.

EXAMPLE 48

One hundred grams of the solid alkyd prepared in Example 1 were placed in a beaker and heated to 130 degrees centigrade until the solid melted to a fluid liquid. With stirring, 62.6 grams of tolylene diisocyanate were added in two parts and stirring continued at 100 degrees centigrade for one minute, after which the mixture became compatible. The fluid liquid was poured into a flat tray of aluminum foil and rapidly cooled to room temperature in ice water. The resulting solid was stored in an air-tight jar at room temperature for 54 days, and the following test was run.

When this solid was melted onto a piece of aluminum, another piece of sanded aluminum was pressed onto the adhesive with a C-clamp and the assembly cured at 120 to 130 degrees centigrade for several hours. The bond thereby produced exhibited a tensile strength of 960 p.s.i.

The following examples were performed under the same conditions to obtain a comparison between a polyurethane foam that contains an auxiliary dicarboxylic acid in addition to chlorendic acid, and a foam that excludes an auxiliary dibasic acid.

EXAMPLE 49

0.664 mole of 1,2,6-hexanetriol and 0.503 mole of chlorendic anhydride were introduced in succession to a reactor and esterified at 170° C. for 3.75 hours. The acid number of the esterification product was 41.5; the hydroxyl number was 223. Then, 90 grams of the esterification product were blended with 10 grams of MPS–500 (a mixture of methyl pentachlorostearate and epoxidized soybean oil), one gram of water, and 0.5 gram of a silicone glycol copolymer cell controller. To the resulting blend was added 63 grams of a commercial mixture of tolylene diisocyanate isomers. The mixture was rapidly agitated for 30 seconds and poured into a mold. The composition foamed in one minute and was cured at 80° C. for 10 minutes.

EXAMPLE 50

A total of 0.53 mole of acidic components, of which 0.168 mole was chlorendic anhydride, and 0.335 mole was adipic acid, was placed in a reactor containing 0.664 mole of 1,2,6-hexanetriol. Th mixture was esterified at 170° C. for 1.25 hours. The esterification product had an acid number of 43.2 and a hydroxyl number of 329. Then, 90 grams of the esterified product were blended with 10 grams of MPS–500, one gram of water, and 0.5 gram of the cell controller used in Example 49. Thereafter, 85 grams of a commercial mixture of tolylene diisocyanate isomers used in Example 49 were added to the blend and mixed with rapid agitation for 30 seconds. The composition was poured into a mold where it foamed in one minute and was then cured at 80° C. for 10 minutes.

The physical properties of the foamed products prepared in Examples 49 and 50 are shown in the following table.

| Example No. | 49 | 50 |
| --- | --- | --- |
| Adipic Acid in Alkyd | No | Yes. |
| Hydroxyl Number of Alkyd | 223 | 329. |
| Nominal Density, pounds per cubic foot | 2 | 2. |
| Water Vapor Transmission, perms | 1.6 | 3.5. |
| Average Specific Compression (25° C.), p.s.i. | 12.4 | 9.5. |
| Compressive Strength, p.s.i.: | | |
| At 100° C | 24 | 11. |
| At 120° C | 28 | Sample to distorted to test. |
| Compression Retention Strength, percent: | | |
| At 100° C | >75 | 61. |
| At 120° C | >75 | |
| Fire Resistance: | | |
| By ASTM D-747-49, inches/minutes | 0.39 | 6.2. |
| By ASTM D-692-59T | Non-burning | Self-extinguishing. |
| Closed Cells, percent | 100 | 95. |

The foregoing results indicate that the water vapor transmission of the foam that did not contain adipic acid was low, while the water vapor transmission of the foam containing the auxiliary acid was too high to meet normal commercial requirements. Low water vapor transmission is important because it indicates that a foam will retain good insulation characteristics over an extended period of time. A comparison of the compressive strength of the two foamed products indicates that the foam that did not contain adipic acid was superior in all respects. The average specific compression determined on the basis of compressive strength at 25° C. was significantly superior to the foam that did not contain adipic acid. Likewise, the showing of compressive strength at elevated temperatures is of considerable interest from a commercial point of view. The foamed product that did not contain adipic acid showed excellent retention of strength, both at 100 and at 120° C. By comparison, the foam that contained adipic acid retained only 61 percent of its room temperature strength at 100° C., and at 120° C. the sample had distorted to such an extent that the determination could not be made.

While the foregoing invention has been described with respect to certain specific embodiments, these have been presented to illustrate the invention, but not to limit it. Hence, other variations of the invention can be practiced without departing from the spirit and scope thereof.

I claim:

1. A polyurethane reaction product of components comprising:
   (A) a hydroxyl-containing composition comprising an alkyd resin comprised of the reaction product of a polycarboxylic compound and a polyhydric alcohol containing at least three hydroxyl groups, wherein the polycarboxylic compound consists of an adduct of hexahalocyclopentadiene and a polycarboxylic compound containing aliphatic carbon-to-carbon unsaturation, wherein the halogen is selected from the group consisting of fluorine, chlorine, bromine and mixtures thereof, and wherein the polycarboxylic compound is selected from the group consisting of a polycarboxylic acid, a polycarboxylic acid anhydride, a polycarboxylic acid halide, and a polycarboxylic acid ester; and
   (B) an organic polyisocyanate in an amount to provide from about 30 to 130 percent of isocyanato groups based on the number of hydroxyl and carboxyl groups present in said hydroxyl-containing composition.

2. A fire-resistant cellular reaction product of components comprising:
   (A) a hydroxyl-containing composition comprising an alkyd resin comprised of the reaction product of a polycarboxylic compound and a polyhydric alcohol containing at least three hydroxy groups, wherein the polycarboxylic compound consists of an adduct of hexahalocyclopentadiene, wherein the halogen is selected from the group consisting of fluorine, chlorine, bromine, and mixtures thereof, and a polycarboxylic compound containing aliphatic carbon-to-carbon unsaturation and selected from the group consisting of a polycarboxylic acid, a polycarboxylic acid anhydride, a polycarboxylic acid halide, and a polycarboxylic acid ester;
   (B) a foaming agent; and
   (C) an organic polyisocyanate in an amount to provide from about 30 to 130 percent of isocyanato groups based on the number of hydroxyl and carboxyl groups present in said hydroxyl-containing composition and foaming agent.

3. A fire-resistant cellular reaction product according to claim 2 wherein said hexahalocyclopentadiene is hexachlorocyclopentadiene.

4. A fire-resistant cellular reaction product according to claim 2 wherein said adduct is 1,4,5,6,7,7-hexachlorobicyclo-(2.2.1)-5-heptene-2,3-dicarboxylic anhydride.

5. A fire-resistant cellular reaction product according to claim 2 wherein said adduct is 1,4,5,6,7,7-hexachlorobicyclo-(2.2.1)-5-heptene-2,3-dicarboxylic acid.

6. A fire-resistant cellular reaction product according to claim 2 wherein said adduct is 1,4,5,6,7,7-hexachlorobicyclo-(2.2.1)-5-heptene-2-acetic-2-carboxylic anhydride.

7. A fire-resistant cellular reaction product according to claim 2 wherein said adduct is 1,4,5,6,7,7-hexachloro-bicyclo-(2.2.1)-5-heptene-2-acetic-2-carboxylic acid.

8. A fire-resistant cellular reaction product according to claim 2 wherein said adduct is 1,4,5,6-tetrachloro-7,7-difluorobicyclo-(2.2.1)-5-heptene-2,3-dicarboxylic anhydride.

9. A fire-resistant cellular reaction product according to claim 2 wherein said adduct is 1,4,5,6-tetrachloro-7,7-difluorobicyclo-(2.2.1)-5-heptene-2,3-dicarboxylic acid.

10. A fire-resistant cellular reaction product according to claim 2 wherein said adduct is 1,4,5,6,7,7-hexachloro-bicyclo-(2.2.1)-5-heptene-2,3-dicarboxylic acid, and said polyhydric alcohol is trimethylol propane.

11. A fire-resistant cellular reaction product according to claim 2 wherein said adduct is 1,4,5,6,7,7-hexachloro-bicyclo-(2.2.1)-5-heptene-2,3-dicarboxylic acid, and said polyhydric alcohol is hexanetriol.

12. A fire-resistant cellular reaction product according to claim 2 wherein said polyisocyanate is a compound selected from the group consisting of 2,4-tolylene diisocyanate, 2,6-tolylene diisocyanate and mixtures thereof.

13. A fire-resistant cellular reaction product according to claim 2 wherein said alkyd resin contains at least 10 percent combined halogen by weight.

14. A fire-resistant cellular reaction product according to claim 2 wherein said adduct is 1,4,5,6,7,7-hexachloro-bicyclo-(2.2.1)-5-heptene-2,3-dicarboxylic acid, and said polyhydric alcohol is glycerol.

15. A fire-resistant cellular reaction product according to claim 2 wherein said adduct is 1,4,5,6,7,7-hexachlorobicyclo-(2.2.1)-5-heptene-2,3-dicarboxylic anhydride, and said polyhydric alcohol is glycerol.

16. A fire-resistant cellular reaction product according to claim 2 wherein said adduct is 1,4,5,6,7,7-hexachlorobicyclo - (2.2.1)-5-heptene-2,3-dicarboxylic anhydride, and said polyhydric alcohol is trimethylol propane.

17. A fire-resistant cellular reaction product according to claim 2 wherein said adduct is 1,4,5,6,7,7-hexachloro-bicyclo-(2.2.1)-5-heptene-2,3-dicarboxylic anhydride, and said polyhydric alcohol is hexanetriol.

References Cited in the file of this patent
UNITED STATES PATENTS

| | | |
|---|---|---|
| 2,602,783 | Simon et al. | July 8, 1952 |
| 2,606,910 | Herzfeld et al. | Aug. 12, 1952 |
| 2,764,565 | Hoppe et al. | Sept. 25, 1956 |
| 2,779,689 | Reis et al. | Jan. 29, 1957 |
| 2,783,215 | Robitschek et al. | Feb. 26, 1957 |
| 2,865,869 | Hindersinn et al. | Dec. 23, 1958 |
| 3,098,047 | Tapas et al. | July 16, 1963 |

OTHER REFERENCES

Bayer: P.B. 45246, pub. January 21, 1947; 5 pages.

De Bell: "German Plastics Practice," copyright 1946; pages 463 to 465.

Barringer: "Rigid Urethane Foams-11 Chemistry and Formation," Du Pont Elastomers Chemicals Dept. Bulletin HR26, April 1958, pages 29–31.